No. 875,894. PATENTED JAN. 7, 1908.
P. CHRISTIANSSON.
CORN PLANTER.
APPLICATION FILED JULY 6, 1906.

Pehr Christiansson, Inventor,

Witnesses
Howard D. Orr.
J. H. Riley

By E. G. Siggers
Attorney

UNITED STATES PATENT OFFICE.

PEHR CHRISTIANSSON, OF CARLOS, MINNESOTA.

CORN-PLANTER.

No. 875,894.

Specification of Letters Patent.

Patented Jan. 7, 1908.

Application filed July 6, 1906. Serial No. 324,982.

*To all whom it may concern:*

Be it known that I, PEHR CHRISTIANSSON, a citizen of the United States, residing at Carlos, in the county of Douglas and State of Minnesota, have invented a new and useful Corn-Planter, of which the following is a specification.

The invention relates to improvements in corn planters.

The object of the present invention is to improve the construction of corn planters, and to provide a simple and comparatively inexpensive one adapted to plant corn in hills and rows the desired distance apart, and capable of ready adjustment to vary the distance between the hills and the rows.

A further object of the invention is to provide a corn planter of this character adapted to be driven continuously back and forth across the land without necessitating the driver leaving his seat, and capable of marking the land at the end of each row for indicating the point where the first hill of the next row is to be planted.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings.

Like numerals of reference designate corresponding parts in all the figures of the drawings.

1 and 2 designate inner and outer parallel side bars or beams, arranged in pairs and constituting the sides of the main frame of the corn planter, which is provided at its front and rear with transverse bars 3 and 4.

The main frame, although shown and described in the present application is not claimed herein, as it forms the subject-matter of a divisional application, Serial No. 377,206, filed June 4, 1907.

The parallel side bars 1 and 2 are connected at intermediate points by suitable cross pieces 5, and are secured at their ends to the sides of front and rear yokes 6 and 7, which are substantially U-shaped. The sides of the yokes are flanged and the bars 1 and 2 are secured to the inner faces of the same. The side bars or beams, which carry the seed dropping and hill marking mechanism, are adjustable toward and from each other to vary the width of the machine to correspond to the distance between the rows, and for this purpose the front yokes are provided with sleeves or boxes 8, which are slidable on the front transverse bar 3, and are secured in their adjustment by means of bolts 9.

The rear yokes are secured by bolts 10 to the rear transverse bar, which is composed of adjustable overlapped flanged sections 11 and 12, which are connected together at the median line of the machine by means of a bolt 13, which forms the pivot of a marker pole 14. The marker pole 14, which is adapted to be swung to either side of the frame, carries a marker blade 15, which is connected by a flexible connection 16 with a traveler ring 17. The traveler ring 17 slides on a transversely disposed guide 18, located at the front of the machine and consisting of an arched rod. The marking device, which is designed for marking off the rows of corn, does not constitute a portion of the present invention, as it is claimed in Patent No. 837,386. The front transverse bar 3 is also composed of two sections, which are connected at their inner ends by means of an upwardly extending arch 19, which projects upwardly from the front of the frame and which provides an opening or recess to receive the tongue or draft beam 20 of the machine. The upwardly projecting connecting arch is provided with laterally extending arms or portions 21, having horizontal flanges at their upper and lower edges and receiving the inner ends of the sections of the front transverse bar. The lateral extensions of the arch are secured to the sections of the front transverse bar by means of horizontal bolts, or other suitable fastening devices, which are located between the upper and lower flanges.

The draft beam or tongue extends rearwardly along the median line of the machine, and its rear end is connected to an axle 22 by means of a socket 23, having a transverse bearing opening for the shaft and provided with a longitudinal recess, in which the rear end of the tongue or draft beam is secured by suitable fastening devices 24. The axle 22, which is journaled in suitable bearings 25 of the side bars or beams 1 and 2, is held against longitudinal movement by means of collars 26, secured to the axle by set screws and arranged adjacent to the inner bars 1. The socket 23 is retained against lateral movement by means of collars 27, secured to the axle by set screws, and located at the side edges of the said socket 23, as clearly illustrated in Fig. 1 of the drawings.

Arranged upon the upper face of the rear end of the tongue is an adjustable foot plate 28, forming a top for the socket 23 and provided at opposite sides with longitudinal slots 29, which receive bolts 30, or other suitable fastening devices for adjustably securing the foot plate to the tongue and to the socket. The foot plate is provided with laterally extended foot rests 31, arranged to receive the feet of the driver. The rear portion of the adjustable foot plate is provided with an upwardly projecting inclined flanged portion 32, which is supported by an integral brace 33, and to which is secured the lower end of a spring standard 34 of a seat 35, which is movable backwardly and forwardly with the adjustable foot plate, so as to arrange the driver within easy reach of the operating levers hereinafter described.

The tongue is braced by inclined rearwardly diverging rods 36, provided with terminal eyes and connected at their front ends with the side edges of the tongue by means of adjustable plates 37, having waved longitudinal slots 38 for the reception of bolts 39, which pierce the tongue and which securely hold the braces from slipping. The plates 37 are provided at their rear ends with eyes 40, into which the front terminal eyes of the rods 36 are linked. The rear terminal eyes of the rods 36 are linked into eyes 41 of collars or rings 42, arranged on the axle, and interposed between the collars 26 and the bearings of the inner bars 1. The connections between the rear ends of the rods or braces 36 and the axle form hinge joints, which conform to the relative adjustment of the tongue and the main frame.

Figure 4:
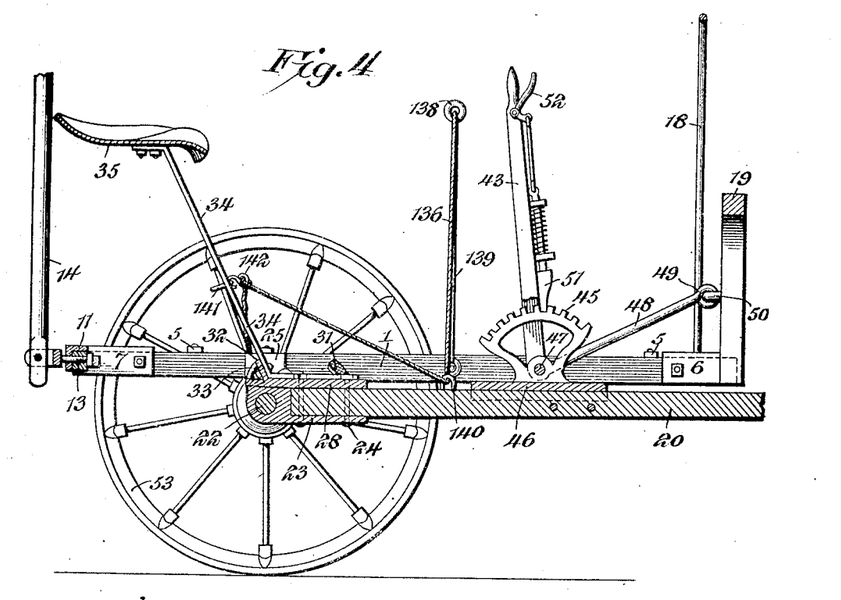
Fig. 4 is a longitudinal sectional view taken substantially on the line 4—4 of Fig. 1.

The main frame is raised and lowered by means of an adjusting lever 43, mounted on the tongue and provided with a forked lower portion 44, which straddles a toothed segment 45. The toothed segment 45 is formed integral with and extends upwardly from a plate 46, which is mounted upon the tongue. The lever is fulcrumed at the lower end of its forked portion by means of a pivot bolt 47, or other suitable fastening device, which is arranged at the bottom of the toothed segment, as clearly illustrated in Fig. 4 of the drawings. The lever is adapted to swing backwardly and forwardly, and it is provided at the sides of its forked portion with forwardly projecting arms 48, which are connected with the sides of the upwardly projecting arch 19, whereby when the lever is oscillated, the front of the frame will be swung upwardly or downwardly. The arms 48 of the lever 43 are provided at their front ends with eyes 49, which are linked into eyes 50 of the sides of the arch 9. The eyes 50 are provided with shanks or plates, which are secured to the outer edges of the sides of the arch at a point between the top and bottom thereof. The main frame adjusting lever is secured in its adjustment by a spring actuated pawl or detent 51, which is arranged to engage the teeth of the segment 45, and which is controlled by a latch lever 52 fulcrumed on the lever 43 adjacent to the upper end thereof.

The machine is supported by carrying wheels 53 and 54, provided with broad concave peripheries to prevent the machine from sinking into the soil and also for the purpose of covering the drilled seed. One or both of the wheels may be fixed to the axle by means of a clamping screw 55, so that the axle will be rotated when the machine moves forwardly.

Mounted upon the axle at each side of the machine in the space between the bars 1 and 2 is a driving sprocket wheel 56, which communicates motion, by the means hereinafter described, to the seed dropping mechanism and to the hill markers. The mechanism at each side of the machine is the same with the exception of the levers 57 and 58 for throwing the machine into and out of operation, the levers 57 being operated by the foot and the lever 58 by hand, as hereinafter more fully explained.

A detail description of the mechanism at one side of the machine will enable the operation of the latter to be thoroughly understood. The driving sprocket wheel 56 is connected by a sprocket chain 59 with a sprocket pinion 60, slidably mounted on an intermediate shaft 61 and provided with a clutch face or section 62, which is adapted to engage a corresponding clutch face or section 63 of a rear sprocket wheel 64 of front sprocket gearing. The intermediate shaft is journaled in suitable bearings of adjustable bearing brackets 65, extending upwardly from the side beams 1 and 2 and provided with flanged base portions, which are slotted at 66, and which are adjustably secured to the side bars or beams by suitable fastening devices. These fastening devices pass through the slots 66, and secure the bearing brackets 65 in their adjustment.

The slidable front sprocket gear 60 is provided at the side opposite that from which the clutch face or section 62 project, with a grooved hub extension 67, which receives a collar 68 provided with arms 69, which are connected by links 70 with the foot lever 57. The foot lever 57, which is of bell crank form, consists of a horizontal foot receiving arm, and an upwardly extending approximately Y-shaped arm 71, which is connected to the said links 70. The contiguous bearing 65 is provided with projecting ears, between which the foot lever 57 is fulcrumed by a suitable pivot, which passes through the angle of the foot lever. The arms 69 of the collar 68, at the opposite side of the machine, are connected by short links 72 with the hand lever 58, and the latter is fulcrumed between its ends on an extension of the adjacent bearing bracket 65. The lower portion of the hand lever 58 is forked to straddle the extension, and the sides have terminal hooks 73 to receive the short links 72. The hand lever is secured in its adjustment by means of a spring actuated detent 74, arranged to engage a toothed segment 75, and connected with a latch lever 76, fulcrumed on the clutch operating lever 58 at the upper handle portion thereof. The toothed segment 75 is formed integral with the extension of the bearing bracket 65, upon which the hand lever 58 is fulcrumed. The driver can throw one set of mechanism out of operation by his foot, and the other set is thrown out of operation by hand.

The bearing brackets 65 are adapted to be adjusted forwardly or backwardly to tighten and slacken the rear sprocket chain, and the front sprocket gearing is provided with a sprocket chain 77 and a front sprocket wheel 78, mounted on a front transverse shaft 79, which is journaled in suitable bearings of adjustable bearing brackets 80. The adjustable bearing brackets 80 are provided with flanged base portions, having slots 81 for the reception of bolts, or other suitable fastening devices for securing the bearing brackets in their adjustment. The front bearing brackets are adapted to be moved backwardly or forwardly to slacken or tighten the chain of the front sprocket gearing. The front sprocket chain is provided with laterally projecting lugs 82 and vertically projecting lugs 83, which are adapted to operate a seed distributing wheel 84, a seed dropping lever 85 and a hill marker 86. The hill marker herein shown and described but not claimed also forms the subject-matter of a divisional application, Serial No. 377,206, filed June 4, 1907.

The laterally projecting lugs 82 form teeth, which are adapted to mesh with projecting teeth 87 of the seed distributing wheel 84 for rotating the latter. These lugs 82, which are carried by reversible links, may be changed from one side of the front sprocket chain to the other to secure the desired rotary movement of the distributing wheel, which is intermittently rotated and which is adapted to be adjusted to drop either a larger or smaller number of kernels of corn.

The changing of the lugs from the outer to the inner side of the sprocket chains is equivalent to removing the lugs, and this operation may be effected without varying the length of the chain.

Figure 6:
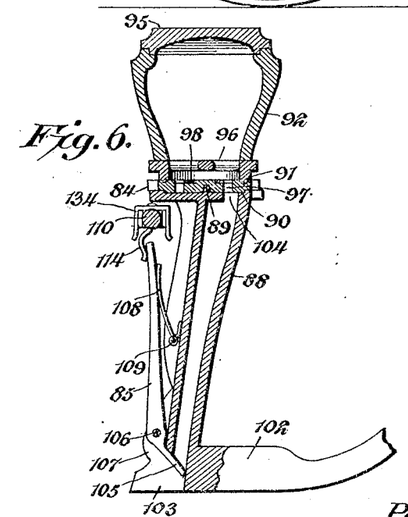
Fig. 6 is an enlarged vertical sectional view, illustrating the construction of the seed dropping mechanism.
Figure 7:
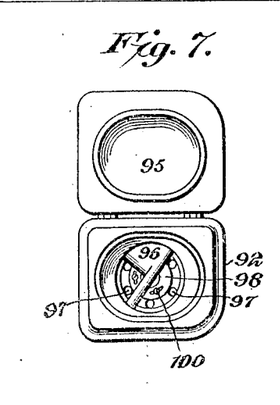
Fig. 7 is a detail view of one of the seed boxes.

The seed distributing wheel, which is arranged horizontally upon the top of a seed tube 88, is provided at its lower face with a central bearing for the reception of a projecting journal 89, but the seed distributing wheel may be mounted in any other desired manner as will be readily understood. The upper face of the top of the seed tube is provided with an annular seat 90 to receive the seed distributing wheel, which is correspondingly recessed, as clearly illustrated in Fig. 6 of the drawings. The upper face of the seed distributing wheel is also grooved at 91 to receive a depending flange or portion of a seed box 92, which is mounted upon the top of the seed tube. The seed box, which is approximately rectangular in horizontal section, tapers from top to bottom, and is connected at its front outer corner with the top of the seed tube by a hinge 93, which permits the hopper to be swung outwardly from over the seed distributing wheel to afford access thereto. The top of the seed tube is provided at the rear side of the hopper with projecting lugs 94 to which the seed box or hopper is detachably secured by screws, or other suitable fastening devices. The seed box is provided with a hinged top 95, and it is provided in its bottom 96 with suitable openings to permit the seed to rest upon the distributing wheel.

The seed distributing wheel is provided at intervals with seed slots or openings 97, and it carries an adjustable plate 98, provided with depending portions 99, which operate in the slots 97 and which are adapted to be moved backwardly and forwardly within the same to vary the size of the exposed portions of the seed slots or openings 97. By this construction, the seed slots or openings 97 may be made of a size to contain the desired number of kernels of corn, or other seed. The adjustable plate is secured at the desired adjustment by means of set screws 100, mounted in threaded sockets of the seed distributing wheel and arranged in curved slots 101 of the adjustable plate. When the plate is partially rotated, the depending portions or lugs 99 of the plate 98 are simultaneously adjusted in the slots or openings 97. Any other suitable means, however, may be employed for varying the size of the seed slots or openings, so that the desired number of grains or kernels will be discharged into the seed tube at each operation of the distributing wheel.

Figure 3:
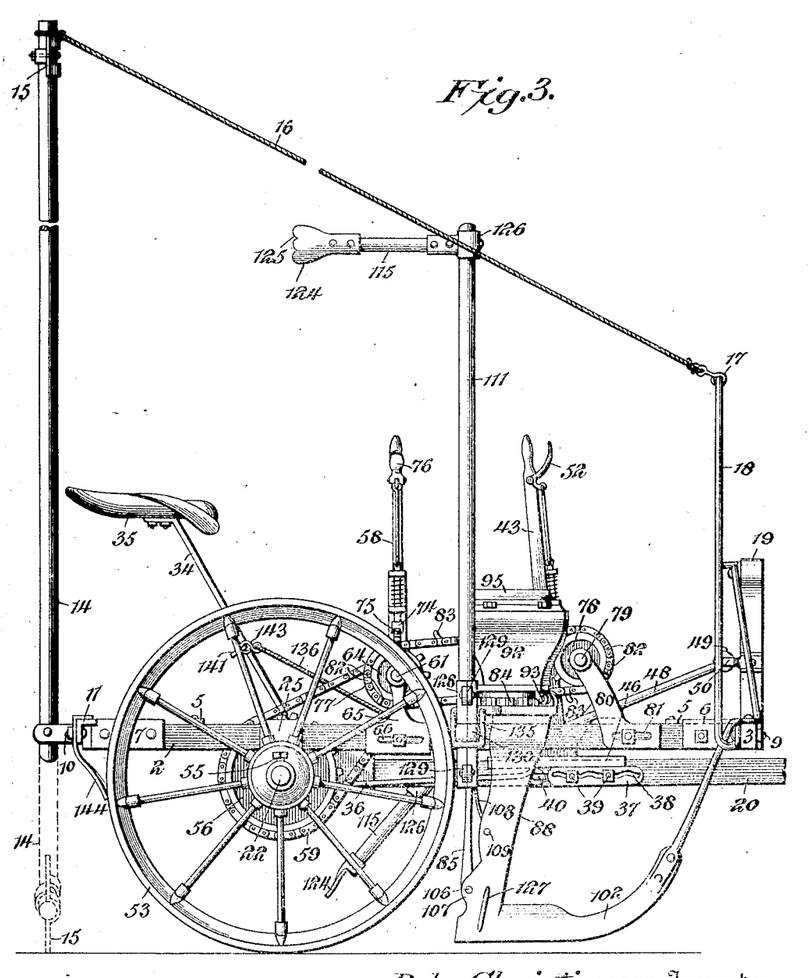
Fig. 3 is a side elevation.
Figure 5:
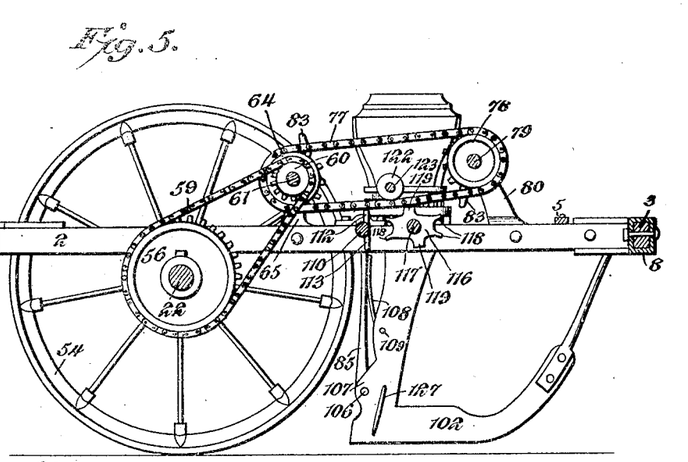
Fig. 5 is a similar view on the line 5—5 of Fig. 1.

The seed tube is connected at its lower end with a runner or shoe 102, having a slotted or bifurcated rear end 103, and adapted to plow a groove or furrow into which the seed is dropped. The discharge of seed from the seed tube into the furrow is controlled by a second dropping device, consisting of the said lever 85, and when the seed is deposited by the distributing wheel into the seed tube through an opening 104 of the upper end thereof, the seed falls to the bottom of the seed tube, and rests upon the lower arm or portion 105 of the lever 85. The lever 85, which consists of a single piece, is fulcrumed near its lower end on a transverse pivot 106, and the lower arm or portion 105 is short and is normally arranged at an inclination, as clearly shown in Fig. 6 of the drawings. The seed tube is provided with rearwardly extending spaced flanges or portions 107, which form a recess for the lever 85. The lever 85 is normally maintained in a closed position by means of a spring 108. The spring 108, which may be of any preferred construction, is arranged between the upper arm of the lever and the seed tube, being mounted on a pin or rivet 109, which pierces the flanges 107. The spring is provided between its ends with an eye, which is arranged on the pin or rivet, and it has a short arm to bear upon the back of the seed tube. The other arm of the spring engages the lever 85, and is adapted to throw the same rearwardly. The seed dropping lever or cut-off 85 is oscillated by a hill marking rock shaft, consisting of an inner section 110 and an outer hinged section 111. The inner section 110 is journaled in suitable bearings of the inner and outer side beams or bars 1 and 2, and it is provided with oppositely projecting tappets 112 and 113, which are normally arranged in a substantially vertical position, as illustrated in Fig. 5 of the drawings. The upwardly projecting tappet 112 is arranged in the path of the lugs 83 of the front sprocket chain, and it is adapted to be engaged by the same, whereby the shaft is partially rotated to swing a short arm 114 forwardly to operate the lever 85, and also to throw a marking arm 115 downwardly to mark the first hill of the next row, the hill markers being used only at the end of a row and being normally arranged in an elevated position, as illustrated in Fig. 3 of the drawings. Only one of the hill markers is used at a time, the one at the side next to the unplanted land being swung downward for operation, when the end of the row is reached.

As illustrated in the accompanying drawings, the laterally projecting lugs 82, which are set for operating the seed distributing wheel, are arranged in pairs, two sets being shown, and they partially rotate the seed distributing wheel prior to the operation of the marker shaft by the adjacent or companion lug 83. The front chain may, however, be of any desired length and may be provided with any number of sets of lugs 82 and 83, so as to drop the seed into the furrow at the desired interval and proper distances apart. When one of the lugs 83 engages the upwardly projecting tappet 112, the latter is swung rearwardly and the arm 114, and the marker arm, which depends from the marker shaft, is swung downwardly. This oscillates the lever 85 to drop the seed into the furrow, and if the outer hinged section 111 of the marker shaft be arranged horizontally, the marker arm 115 will be swung downwardly to mark the land for the purpose heretofore described.

The lug 83 prior to engaging the upwardly projecting tappet 112 operates a mutilated sprocket wheel 116, which is rotated one half a revolution at each operation, and which is adapted to engage the depending tappet 113 for swinging the same rearwardly to return the marker shaft to its initial position, so that the upwardly projecting tappet will be in proper position to be engaged by the succeeding lug 83. The mutilated sprocket wheel 116, which is mounted on a transverse shaft 117, is provided at diametrically opposite points with sprocket teeth 118, which are arranged in pairs and which are adapted to mesh with the lower stretch of the front sprocket chain. The said wheel 116 is also provided with oppositely disposed lugs 119, which are adapted to be alternately engaged by the lugs 83, whereby the wheels 116 will be rotated sufficiently to bring the front sprocket teeth 118 into position to mesh with the front sprocket chain, and thereby produces a positive partial rotary movement of the said wheel 116.

By means of the foregoing construction, the marker shaft is rocked and the intermittent partially rotated movement is imparted to the wheel 116. When the upwardly projecting tappet 112 of the marker shaft is swung rearwardly, the depending tappet 113 is swung forwardly and upwardly, and at the limit of such movement of the rocker shaft, the tappet 113 is engaged at its upper face by one of the teeth of the wheel 116, which positively swings the tappet 113 downwardly to assist the return movement of the marker shaft. The spring 108 also actuates the marker shaft during such return movement by passing the upper arm of the lever 85 to engage the depending arm 114 of the marker shaft, and the said spring 108 yieldably holds the marker arm 115 in an inclined position above the ground.

Figure 1:
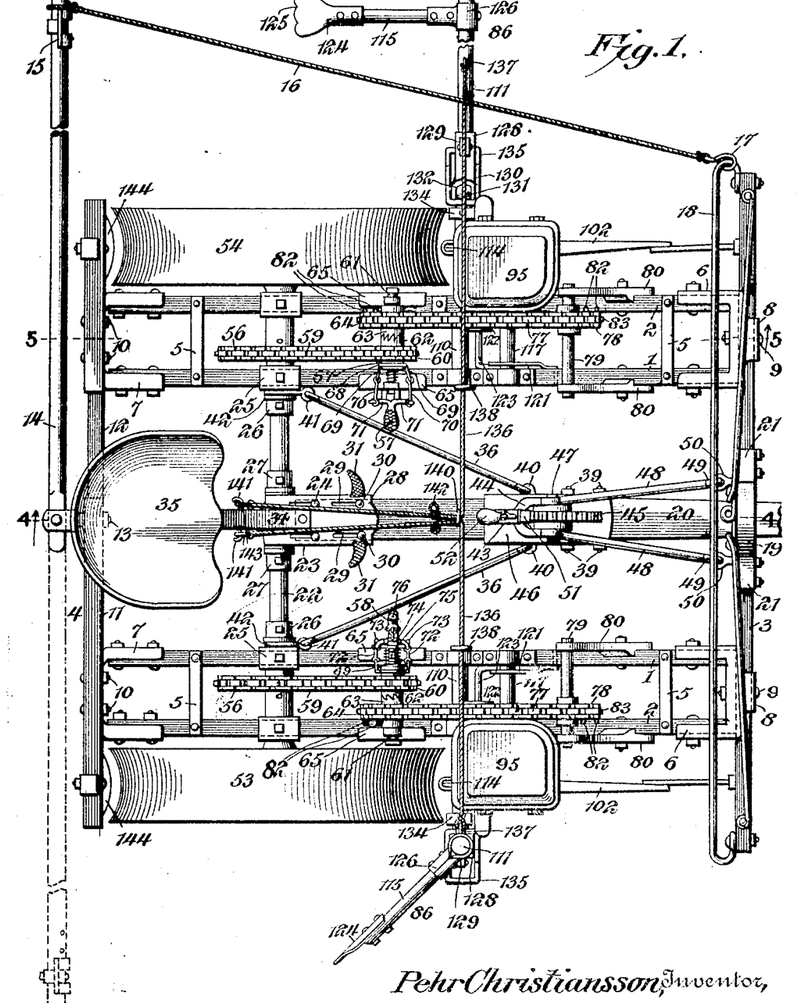
—Figure 1 is a plan view of a corn planter constructed in accordance with this invention.
Figure 2:
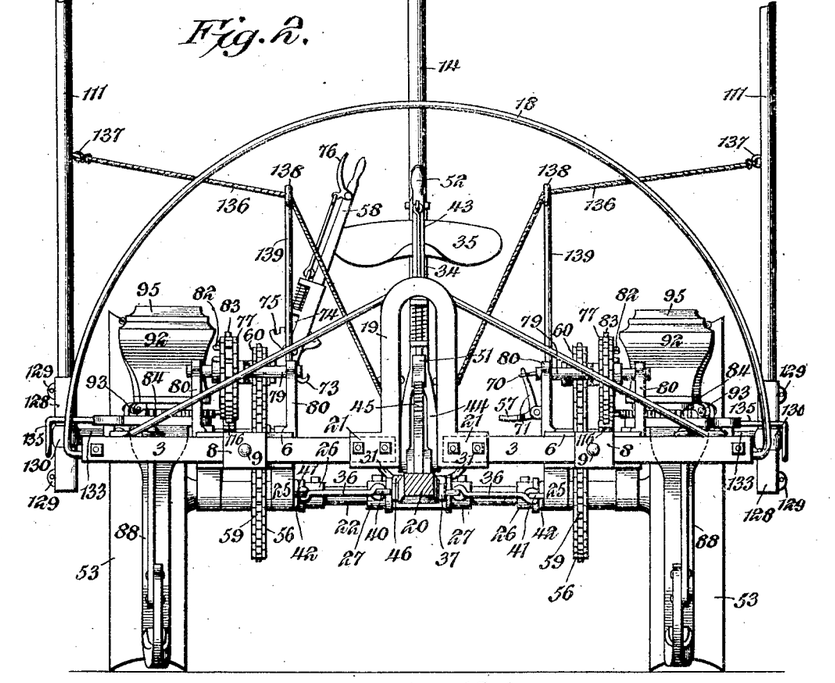
Fig. 2 is a front elevation, the tongue being in section.
Figure 14:
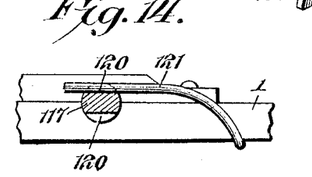
Fig. 14 is an enlarged detail sectional view, illustrating the arrangement of the flattened portions of the shaft of the mutilated sprocket wheel and the arrangement of the spring for yieldably engaging the shaft.

In order to prevent the mutilated sprocket wheel 116 from being rotated too great a distance, the shaft 117 is provided with opposite flattened portions 120, see Figs. 1 and 14 formed by grooves or recesses, and the upper one of such flat portions 120 is engaged by a spring 121, which yieldably holds the wheel 116 in the position illustrated in Fig. 5 with its sprocket teeth 118 at the front and back and its lugs 119 at the top and bottom. The spring 121 is secured at one end to the inner side bar or beam 1 at a point in advance of the shaft, and the other end of the spring is free and engages the shaft 117.

The lower stretch of the front sprocket chain is held against upward movement by an idler 122, which maintains the bottom lugs in position for actuating the seed distributing wheel, the sprocket wheel 116, and the marker shaft. This idler consists of a smooth wheel, mounted on an arm 123, which is approximately L-shaped and which is mounted on the inner side bar or beam 1.

The marker arm 115, which is normally arranged at an inclination when the outer section of the marker shaft is horizontal, extends downwardly and rearwardly from the outer end of the marker shaft, as clearly illustrated in Fig. 3 of the drawings, and it is swung downwardly and forwardly when the marker shaft is operated by the lugs 83. The engaging end of the marker shaft is provided with a substantially spoon-shaped marking blade 124, which has a corrugated or scalloped lower edge 125, forming a plurality of projecting portions to enable the marker arm to make a distinct mark on the land for indicating the first hill of the next row. The marking blade 124 is provided with a shank, which is secured to the marking arm 115, and the latter is connected with the outer end of the marker shaft by means of a collar 126, provided with depending extensions, which embrace the marker arm and forms a socket for the same. The collar 126 is adjustably secured to the section 111 by means of a screw, or other suitable fastening device, and is adapted to be moved inwardly and outwardly on the said section 111 to arrange the hill marking arm the proper distance from the side of the machine to correspond to the width of the rows.

Figure 8:
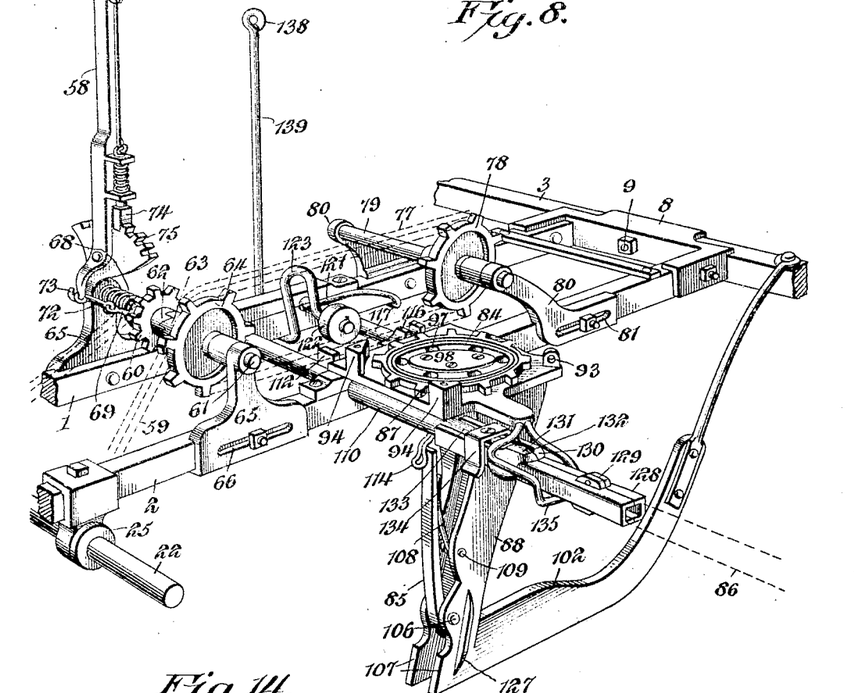
Fig. 8 is an enlarged perspective view of one side of the front portion of the machine, parts being removed to illustrate the seed dropping mechanism and the hill marker more clearly.
Figures 9, 10, 11, 12:
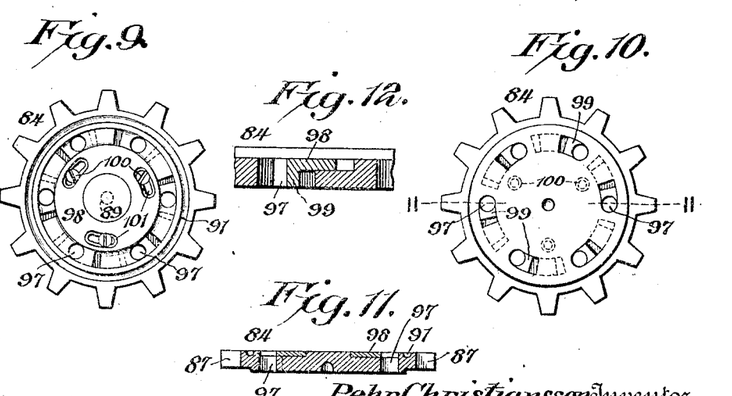
Figs. 9 and 10 are detail views, illustrating the construction of the seed distributing disk or wheel.
Fig. 11 is a sectional view on the line 11—11 of Fig. 10, the lug of the adjustable plate being indicated at one side by a dotted line.
Fig. 12 is an enlarged detail sectional view of the seed distributing disk or wheel.

A fixed indicator 127, consisting of a rib or flange, is formed integral with the seed tube, and is arranged at a slight inclination at the outer side thereof, as clearly shown in Fig. 8 of the drawings. When the corn planter is turned at the end of a row, this indicating flange or rib is placed outside the mark made by the hill marker, and the seed will be deposited the proper distance from the row previously planted.

The hinged outer section of the marker shaft is connected with the inner section by a partial ball and socket joint, the inner end of the outer hinged section being provided with a longitudinal box or casing 128, composed of two longitudinal sections, secured together by rivets or other suitable fastening devices, which are arranged in perforated ears or flanges 129. The box or casing forms a sleeve to receive the inner end of the outer section 111, and it is provided at an intermediate point with a socket 130, receiving and conforming to the configuration of a ball 131, which is carried by the outer end of the section 110, and which forms a head for the same. The box or casing is provided at the top of the socket 130 with a slot or opening 132, which extends to the inner end of the box or casing and which permits the outer section 111 of the marker shaft to swing upwardly from a horizontal position to the vertical position illustrated in Figs. 1 and 3 of the drawings. When the outer section of the marker shaft is arranged in a horizontal position, the inner slotted portion of the box or casing receives the outer end of the inner section 110 to form a rigid joint. The outer portion 133 of the inner section 110 is squared, and a yoke 134 is secured to the squared portion to assist in forming a stiff joint or coupling. The yoke consists of a top transverse portion and depending sides, which have flared or outwardly bent lower terminals to enable the inner end of the box or casing to readily enter the yoke. The transverse top portion of the yoke is pierced by a fastening device or devices for securing the yoke to the squared inner section 110.

The outer hinged section 111 of the marker shaft is guided in its upward and downward swinging movements by means of a substantially L-shaped loop 135, consisting of an approximately horizontal portion and a depending vertical portion. The depending vertical portion of the loop-shaped guide 135 forms a stop and a rest for the outer section of the marker shaft, when the same is in a horizontal position, and the loop-shaped guide, which permits the outer section 111 to swing upwardly and downwardly, does not interfere with the rotary movement of the marker shaft and prevents the outer section from swinging longitudinally of the machine, when the former is raised. When the outer section is swung upwardly to a vertical position, the inner slotted portion of the box or casing 128 is carried out of the yoke and does not interfere with the oscillatory or partial rotary movement of the inner section 110, which is necessary to operate the seed dropping lever 85. The guides 135 are mounted on lateral extensions of the tops of the seed tubes.

The hinged outer sections 111 of the marker shafts are swung upwardly, and are maintained in a vertical position by means of ropes 136, or other suitable flexible connections, secured at their outer ends to the hinged sections 111, which are provided at intermediate points with eyes 137. The flexible connections 136 extend from the outer sections of the marker shafts to guides 138 of standards 139, which are located at opposite sides of the machine and which are mounted on the inner bars or beams 1. The flexible connections then pass downwardly and inwardly in a direction transversely of the machine to a central guide 140, which is mounted on the tongue or draft beam. The inner terminals of the flexible connections are adapted to be secured to hooks 141, which are located at opposite sides of the spring standard of the seat. The inner terminal portions of the flexible connections 136 are provided with intermediate and terminal eyes 142 and 143; the terminal eye 143 of the flexible connection 136 is engaged with the hook 141, when the outer section 111 of the hill marker shaft is arranged in a horizontal position for operation, and the intermediate eye 142 is engaged with the hook 141 to hold the outer section 111 in an elevated position.

The rear transverse bar of the frame is extended laterally beyond the inner and outer side bars or beams, and provides supports for a pair of scrapers 144 for removing dirt and other accumulation from the peripheries of the carrying wheels. These scrapers, which depend from the extended ends of the rear transverse bar, are curved to conform to the concave peripheries of the wheels.

Figures 13, 15, 16:
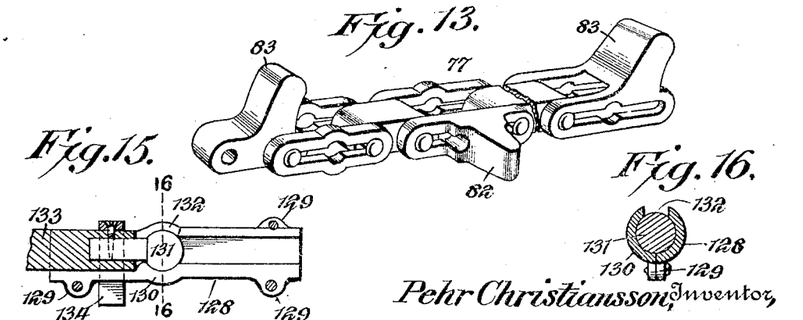
Fig. 13 is an enlarged detail perspective view of a portion of the front sprocket chain, illustrating the construction of the projecting lugs.
Fig. 15 is an enlarged detail sectional view taken longitudinally of the joint of the hill marker shaft.
Fig. 16 is a transverse sectional view on the line 16—16 of Fig. 15.

The vertically projecting lugs 83 of the front sprocket chain may be formed integral with either the intermediate or the side links of said chain, as clearly illustrated in Fig. 13 of the drawings.

It will be seen that the corn planter is capable of ready adjustment to arrange its parts for planting the hills the desired distance apart in each direction, that it is adapted to obviate the inconvenience of stretching a line across the field to form a guide for planting, and that the driver does not have to leave his seat throughout the entire planting operation. Also it will be clear that either of the hill markers may be readily swung downward to a horizontal position accordingly as the machine is at one side or the other of a field.

Having thus fully described my invention, what I claim as new and desire to secure by Letters Patent, is:—

1. In a machine of the class described, the combination of a frame, an axle supporting the frame, seed dropping mechanism mounted on the frame at opposite sides thereof, gearing located at opposite sides of the frame and connected with the axle for actuating the seed dropping mechanism, clutches located at a point in advance of the axle for throwing the machine into and out of operation, a foot lever connected with one of the clutches, a hand lever located at the opposite side of the frame and connected with the other clutch, and a seat located in rear of the said levers.

2. In a machine of the class described, the combination of a seed tube, a lever consisting of a single piece and arranged outside of the seed tube and extending alongside the rear wall thereof and having its lower end inclined and extending downwardly and forwardly across the lower end of the seed tube, said lever being fulcrumed between its ends at a point above the inclined lower end, a spring for holding the lever normally in its closed position, a shaft having an arm for actuating the lever to open the seed tube, and gearing provided with means for operating the shaft.

3. In a machine of the class described, the combination of a seed tube, a lever fulcrumed at an intermediate point and having upper and lower arms and forming a cut-off for the seed tube, a spring located in advance of and engaging the upper arm of the lever for holding the latter in its closed position, a horizontal shaft having a depending arm located in rear of the upper arm of the lever and arranged to engage the same for actuating the lever to open the seed tube, and gearing for operating the shaft.

4. In a machine of the class described, the combination of a seed tube, a lever forming a cut-off for the same, a spring for holding the lever normally in its closed position, a rock shaft provided with a tappet and having an arm for actuating the lever to open the seed tube, and sprocket gearing provided at intervals with lugs for engaging the tappet.

5. In a machine of the class described, the combination of a shaft provided with oppositely projecting tappets, a sprocket chain having a lug for engaging one of the tappets to turn the shaft in one direction, and a sprocket wheel arranged to be thrown into operation by the said lug and actuated by the sprocket chain for engaging the other tappet to turn the shaft in the opposite direction.

6. In a machine of the class described, the combination of a shaft provided with opposite tappets, a sprocket chain having a lug for engaging one of the tappets, a sprocket wheel arranged in the path of the said lug and provided with a lug for engagement with that of the chain, said sprocket wheel being also provided with teeth to mesh with the sprocket chain and being adapted to engage the other tappet of the shaft to return the latter to its initial position.

7. In a machine of the class described, the combination of a shaft provided with opposite tappets, a sprocket chain having a lug for engaging one of the tappets, and a sprocket wheel having opposite lugs and provided with opposite sets of sprocket teeth, the lugs being adapted to be engaged by the lug of the sprocket chain, and the sprocket teeth being adapted to mesh with the sprocket chain, whereby the sprocket wheel is caused to engage the other tappet of the shaft to return the latter to its initial position.

8. In a machine of the class described, the combination of a shaft provided with opposite tappets, a sprocket chain having means for engaging one of the tappets, a sprocket wheel arranged to be actuated by the sprocket chain for engaging the other tappet of the shaft, and yieldable means for limiting the rotary movement of the sprocket wheel.

9. In a machine of the class described, the combination of a shaft, a spring engaging the shaft to limit the movement thereof, a sprocket wheel mounted on the shaft, a sprocket chain having means for engaging the sprocket wheel, and a shaft provided with opposite tappets, one of the tappets being arranged to be actuated by the chain, and the other tappet being arranged to be engaged by the sprocket wheel.

10. In a machine of the class described, the combination of a rock shaft, a hill marking arm mounted on and carried by the rock shaft, dropping mechanism, and means for partially rotating the shaft for causing the arm to mark the land and for operating the dropping mechanism.

11. In a machine of the class described, the combination of a rock shaft, a hill marking arm mounted on and carried by the rock shaft and arranged to swing upward and downward to and from the ground, dropping mechanism, and means for rocking the shaft for operating the hill marking arm and the dropping mechanism.

12. In a machine of the class described, the combination of a rock shaft, dropping mechanism operated by the rock shaft, and a hill marking arm mounted on and carried by the rock shaft and adjustable longitudinally thereof toward and from the dropping mechanism.

13. In a machine of the class described, the combination of a horizontal rock shaft, a hill marking arm mounted on and carried by the rock shaft and arranged to engage the ground, means for yieldably holding the marking arm above the ground, dropping mechanism, and means for intermittently rocking the shaft for actuating the hill marking arm and dropping mechanism.

14. In a machine of the class described, the combination of a rock shaft, a hill marking arm carried by the rock shaft, means for yieldably holding the hill marking arm normally above the ground, dropping mechanism, and a sprocket chain having adjustable means for intermittently rocking the shaft for operating the hill marking arm and the dropping mechanism.

15. In a machine of the class described, the combination of a rock shaft provided with a tappet, a hill marking arm mounted on and carried by the rock shaft, dropping mechanism, and a sprocket chain provided with a plurality of removable and adjustable lugs for engaging the tappet to rock the shaft at intervals for operating the hill marking arm and the dropping mechanism.

16. In a machine of the class described, the combination of a seed tube, a spring actuated cut-off for the seed tube, a rock shaft having an actuating arm arranged to engage the cut-off, a hill marking arm carried by the shaft, a tappet also projecting from the shaft, and gearing for engaging the tappet to rock the shaft, whereby the cut-off and hill marking arm are operated simultaneously 17. In a machine of the class described, the combination with dropping mechanism, of a rock shaft having a hill marking arm and provided with means for operating the dropping mechanism, a sprocket chain, a sprocket wheel, coöperating means carried by the chain and the rock shaft for moving the latter in one direction, and means mounted on the rock shaft and actuated by the sprocket wheel for moving the former in the opposite direction.

18. The combination with dropping mechanism, of a sprocket chain, a rock shaft having a hill marking arm and provided with means for operating the dropping mechanism and intermittently moved in one direction by the sprocket chain, a sprocket wheel also intermittently operated by the sprocket chain, and means mounted on the rock shaft and actuated by the sprocket wheel for moving the said rock shaft in the opposite direction.

19. The combination with dropping mechanism, of a sprocket chain, a rock shaft having a hill marking arm and provided with means for operating the dropping mechanism, coöperating means carried by the chain and the rock shaft for intermittently moving the latter in one direction, a sprocket wheel also intermittently actuated by the sprocket
5 chain, and means mounted on the rock shaft and actuated by the sprocket wheel for moving the former in the opposite direction.

In testimony, that I claim the foregoing as my own, I have hereto affixed my signature in the presence of two witnesses.

PEHR CHRISTIANSSON.

Witnesses:
C. H. LARSON,
N. O. JOHNSON.